No. 870,175.  
PATENTED NOV. 5, 1907.  
J. H. HUHN.  
CAR LOADER.  
APPLICATION FILED OCT. 14, 1905.
2 SHEETS—SHEET 1.
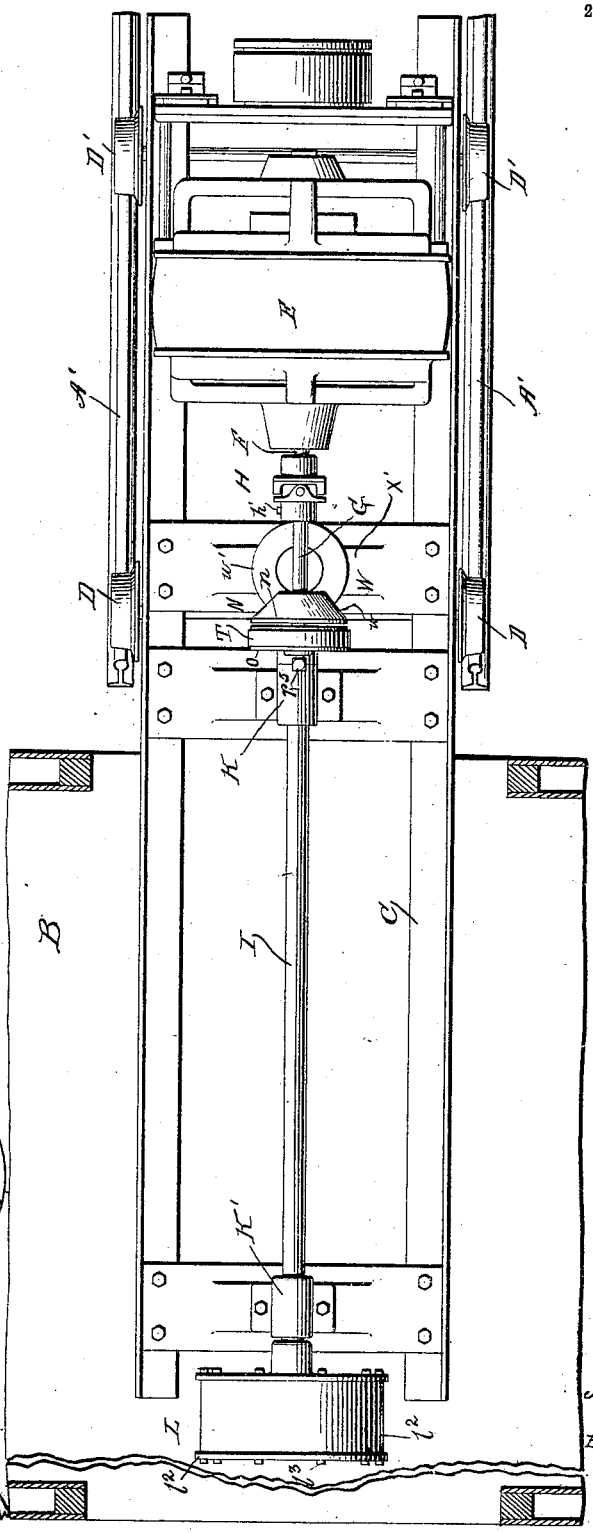
Witnesses  
Inventor  
John H. Huhn.  
By A. H. Bliss  
Attorney No. 870,175. PATENTED NOV. 5, 1907.
J. H. HUHN.
CAR LOADER.
APPLICATION FILED OCT. 14, 1905.
2 SHEETS—SHEET 2.
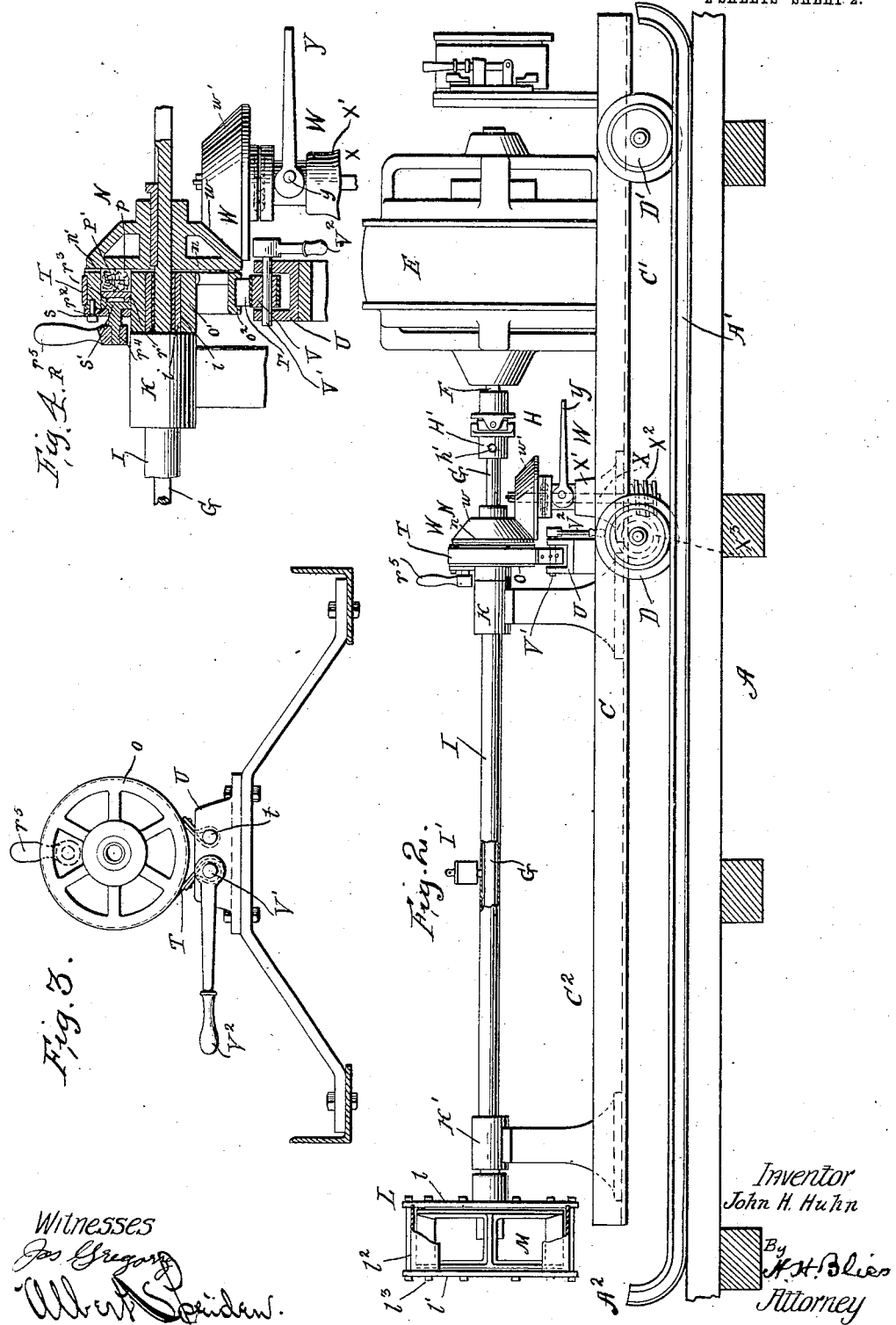
Witnesses
Jos Gregory
Albert Speiden
Inventor
John H. Huhn
By N. H. Bliss
Attorney

UNITED STATES PATENT OFFICE.

JOHN H. HUHN, OF FAIRMONT, WEST VIRGINIA, ASSIGNOR TO FAIRMONT BOX CAR LOADER COMPANY, OF FAIRMONT, WEST VIRGINIA, A CORPORATION OF WEST VIRGINIA.

CAR-LOADER.

No. 870,175.　　　Specification of Letters Patent.　　　Patented Nov. 5, 1907.

Application filed October 14, 1905. Serial No. 282,776.

*To all whom it may concern:*

Be it known that I, JOHN H. HUHN, a citizen of the United States, residing at Fairmont, in the county of Marion and State of West Virginia, have invented certain new and useful Improvements in Car-Loaders, of which the following is a specification, reference being had therein to the accompanying drawing.

This invention relates to improvements in mechanisms adapted to distribute material or deliver material to a desired point, it being particularly adapted for the purpose of loading box cars.

The invention embodies improvements upon the mechanism set forth and claimed in my joint application with C. F. Ice, Serial No. 260,140, filed May 12th, 1905, for car loader, i. e. of the type of loader in which there is a rotatable material receiving casing and a rotary material distributing shovel therein.

Of the several objects of the invention, those of most importance are the providing of carriage moving means interposed between a motor on the carriage and the carriage supporting wheels for causing the forward and backward travel of the carriage, and also the providing power transmitting means interposed between the motor and the rotatable casing adjusting sleeve for effecting the adjustment of the casing. Preferably both the carriage moving means and the casing adjusting devices are operable and controllable from a point without the car when the carriage is introduced into the car so as to maintain the casing in proper working position therein, and both are actuated by the same motor which drives the rotary shovel within the casing.

Other objects of the invention will be disclosed from the description of a box car loader embodying my improvements which I have chosen for the purpose of illustration.

Figure 1 is a plan view of a car loading or material propelling and distributing mechanism embodying my improvements, part of a car being shown more or less conventionally. Fig. 2 is a side elevation of the parts shown in Fig. 1 withdrawn from the car. Fig. 3 is a vertical cross-sectional view illustrating the brake mechanism in elevation. Fig. 4 is a view partly in section and partly in side elevation of a portion of the mechanism. Fig. 5 is a sectional view through the casing in which the distributing head is mounted.

In the drawings I have shown the operative parts of the mechanism supported upon a platform or in a housing at the side of the car track, this being indicated as a whole by A. There is also conventionally shown in Fig. 1 a portion of an ordinary box freight car at B. Upon the platform A there is provided a track having rails $A'$ with stops $A^2$ at front and rear thereof, and upon these rails there is mounted a truck or carriage having the platform C and the truck wheels D, $D'$ fitted to the rails $A'$. The rear or outer portion of this truck frame is indicated by $C'$ and the forward or inner portion by $C^2$.

Upon the rear part $C'$ is mounted a motor E which for many reasons is preferred to be of the form of an electric motor coupled directly to the driving shaft of the distributing head or shovel. The armature shaft F projects somewhat forward beyond the motor and is connected to the driving shaft G by a universal coupling H. The driving shaft G should be capable of being relieved of excessive load after a certain limit of resistance has been reached. Such yielding and stoppage of the shaft may be provided for by having a friction clamp coupling interposed between the driving shaft element and the part at H, but I find that by inserting the rear end of the shaft G into a sleeve or hub $H'$ on the coupling H and securing it therein by a breakable device such as a wooden pin $h'$, that the necessary factor of safety for the driving mechanism calculated to yield or give away at a certain point under an excessive load is supplied.

The shaft G is extended forward a relatively long distance and is passed through a hollow sleeve or shaft I. The latter is so formed or provided with bushings, that long bearings therein shall be furnished for the rapidly rotating interior shaft G, and at these bearings the sleeve or hollow shaft I is mounted in external bearings at K, $K'$. Between the bearings a large oil cavity is provided because of the diameter of the interior shaft G being considerably smaller than the interior diameter of the surrounding sleeve or shaft I. The lubricant is supplied from a receptacle $I'$ and tends to flow in either direction and finally reaches the interior bearings of the driving shaft.

The propelling apparatus or distributing devices comprises an external rotatable casing or shell, indicated as an entirety by L, and an interior rotary head or shovel indicated, as a whole, by M. The shell or casing part L is formed of a support or carrier $l$ at the rear end, a ring wall or annulus $l'$ at the front end, a peripheral wall $l^2$ and binding or clamping devices $l^3$. With reference to the design and construction of the casing L and the rotary head or shovel M, they may be of any well known or preferred type, and for this reason I do not consider it necessary to describe them in detail. The peripheral wall $l^2$ of the casing has an opening $l^4$ therein through which the propelling blades or vanes of the rotary head or shovel drive or force the material to be distributed. The blades or vanes upon the rotary head should be of some well known form adapted to operate efficiently and satisfactorily in either direction in which they may be rotated.

I have found it decidedly advantageous, especially where the casings are large and heavy, that some sort of motive power be utilized for rotating the hollow shaft or sleeve I to adjust the rotatable casing L so as to position the opening $l^4$ therein to distribute the material in any direction desired within the car. For this purpose I have found it convenient to interpose power transmitting devices between the motor for driving the rotating head or shovel M and the said hollow shaft or sleeve I. In the drawings this train of power transmitting devices is indicated as an entirety by N. Of it $n$ represents a friction disk rigidly secured to the shaft G and having a front vertical friction face $n'$. $o$ indicates a wheel having a hub $o'$ rigidly secured to a portion $i$ of the shaft I which extends rearward from the bearing K, the hub $o'$ preferably abutting at its front end against the rear end of the said bearing, and at its rear end being closely adjacent to the vertical friction face of the wheel $n$ but not touching it. $p$ is a friction shoe or block mounted within the wheel $o$ arranged to slide transversely thereof between the inner rim wall and the hub of the wheel, and adapted to have its rear face $p'$ engage with the vertical friction face $n'$ of the friction wheel $n$. R indicates as an entirety a hand controlled means for effecting the movement of the friction block or shoe $p$ so as to cause it to effectively engage with and rotate with the friction wheel $n$. This friction shoe controlling device is preferably formed in two parts, it comprising a disk $r'$ having a forwardly projecting cam surface, a disk $r^2$ having a rearwardly projecting cam surface $r^3$ adapted to engage with the cam surface on the rear disk $r'$, the said part $r^2$ having a forward extending shaft $r^4$ to the front end of which is rigidly secured a hand lever $r^5$. $s$ is a bearing and abutment plate secured to the front face of the wheel $o$ and having a bearing $s'$ in which the shaft part $r^4$ of the cam element $r^2$ is mounted. It will be observed that when the operator grasps the hand lever $r^5$ and swings it about the axis of the shaft $r^4$ that the cam surfaces of the disks $r'$, $r^2$, assuming that the handle was in a vertical position, will engage with each other and tend to force the parts of the friction shoe controlling element apart and, as the front part $r^2$ is held against forward movement, the rear one $r$ will move and will press the shoe $p$ into engagement with the vertical friction surface $n'$ of the friction wheel $n$. If the wheel $n$ is rotated, sufficient pressure can be applied to the hand lever $r^5$ to cause a frictional engagement between the friction shoe $p$ and the said friction wheel $n$ which will be sufficient to cause the wheel $o$ to travel with the wheel $n$ and consequently to turn the hollow shaft or sleeve I and rotate the casing L.

The periphery of the wheel $o$ is recessed as indicated at $o^2$ to receive a brake band T. One end of this brake band is connected by a pin $t$ to a block U rigidly supported in any suitable manner on the carriage frame and preferably beneath the wheel $o$ and the other end of the said brake band is mounted upon an eccentric V carried by a shaft V′ loosely mounted at either end in the said block U.

$V^2$ is a hand lever for controlling the rotation of the shaft V′ and the operation of the eccentric V so that it will draw downward the end of the brake band T connected to it and cause the clamping of the said band upon the wheel $o$.

I have also found it desirable to control the forward and backward travel of the truck C by means of motor driven mechanism, and with this end in view have interposed between the motor E and the carriage running gear a train of power transmitting devices which is indicated as an entirety by W. Of this train of power transmitting devices W, $w$ indicates a bevel gear rigidly secured to the shaft G. As shown it may be formed integral with the friction wheel $n$ and project rearward therefrom. $w'$ is a bevel gear splined to a vertical shaft X in suitable bearing standard X′ on the carriage frame, the said bevel gear $w'$ being adapted to be moved up and down on the said vertical shaft. For this purpose I have provided an eccentric lever Y pivotally mounted at $y$ at one side of the bearing standard X′ and adapted to have its under surface engage with an offset wall $x$ on the said bearing surface and to have its upper surface engage with the under surface of the bevel wheel $w'$ or its hub. $X^2$ is a worm secured to the lower end of the vertical shaft X and meshing with a worm gear $X^3$ rigidly secured on the axle to which the front car wheels D, D are rigidly secured. Preferably the bevel gears $w$ and $w'$ are friction gears although they may be toothed gears if desired.

In operation in order to cause either the forward or backward travel of the carriage, the operator sets the motor E to rotating in the desired direction and then by bearing down upon the lever Y throws the eccentric thereon so as to cause the upward movement of the gear $w'$ and its engagement with the gear $w$. Power is then transmitted to the track wheels D, D so as to rotate them in the desired direction. The carriage will then travel along its track way in the desired direction and will cease so traveling when the operator releases the pressure on the lever Y.

What I claim is:—

1. In a loader or distributer, the combination with a rotatable material receiving casing and a rotary material distributing head therein, of a drive shaft for said rotary head, a hollow casing adjusting shaft on said drive shaft, a motor, and power transmitting devices interposed between said motor and said casing adjusting shaft for actuating it.

2. In a loader or distributer, the combination of a carriage adapted to travel forward and back, a rotatable material receiving casing having a hollow actuating shaft, a rotary material distributing head in said casing having a driving shaft extending through said hollow actuating shaft, a motor on the carriage, and power transmitting devices interposed between said motor and said hollow actuating shaft.

3. In a loader or distributer, the combination of a carriage adapted to travel forward and back, a rotatable material receiving casing having a hollow actuating shaft, a rotary material distributing head in said casing having a driving shaft extending through said hollow actuating shaft, a motor on the carriage, power transmitting devices interposed between said motor and said hollow actuating shaft, and power transmitting devices interposed between said motor and the carriage running gear for effecting the forward and backward travel of the carriage.

4. In a loader or distributer, the combination of a carriage adapted to travel forward and back, a motor on the carriage, power transmitting devices interposed between the motor on the carriage and the carriage running gear for effecting the travel of the carriage, a rotatable material receiving casing mounted on the carriage, a hollow casing actuating shaft, a rotary distributing head within said casing, a drive shaft for said rotary head extending through said hollow casing actuating shaft, means connecting said drive shaft with said motor, and means for connecting said casing actuating shaft to said motor.

5. In a loader or distributer, the combination of a carriage adapted to travel forward and back, a motor on said carriage, a rotatable material receiving casing on the carriage, having a discharge opening for the material, a rotary material distributing head within said casing, a drive shaft connected with said rotary head and with said motor, a hollow casing actuating shaft mounted on said drive shaft and connected with said casing, and power transmitting devices interposed between said casing actuating shaft and said drive shaft.

6. In a loader or distributer, the combination of a carriage adapted to travel forward and back, a motor on said carriage, a rotatable material receiving casing on the carriage having a discharge opening for the material, a rotary material distributing head within said casing, a drive shaft connected with said rotary head and with said motor, a hollow casing actuating shaft mounted on said drive shaft and connected with said casing, and power transmitting mechanism comprising a friction drive interposed between said casing actuating shaft and said drive shaft.

7. In a loader or distributer, the combination of a carriage adapted to travel forward and back, a motor on the carriage, a rotatable material receiving casing on the carriage having a discharge opening, a rotary material distributing head in said casing, a drive shaft connected with said head and with said motor, a hollow casing actuating shaft mounted on said drive shaft and connected at one end to said casing, power transmitting devices interposed between said casing actuating shaft and said motor, and means for controlling the action of said power transmitting devices operable from a point without the car when the casing is in working position within the car.

8. In a loader or distributer, the combination of a carriage adapted to travel forward and back, a motor on the carriage, a rotatable material receiving casing on the carriage having a discharge opening, a rotary material distributing head in said casing, a drive shaft connected with said head and with said motor, a hollow casing actuating shaft mounted on said drive shaft and connected at one end to said casing, power transmitting devices interposed between said casing actuating shaft and said drive shaft, and means for controlling the action of said power transmitting devices operable from a point without the car when the casing is in working position within the car.

9. In a loader or distributer, the combination of a carriage adapted to travel forward and back, a motor on the carriage, a rotatable material receiving casing on the carriage having a discharge opening, a rotary material distributing head in said casing, a drive shaft connected with said head and with said motor, a hollow casing actuating shaft mounted on said drive shaft and connected at one end to said casing, and friction driving mechanism interposed between said casing actuating shaft and comprising a longitudinally stationary friction element, a longitudinally movable friction element, and means for effecting the engagement of said movable element with said stationary one.

10. In a loader or distributer, the combination with a rotatable material receiving casing and a rotary material distributing head therein, of a drive shaft for said rotary head, a hollow casing adjusting shaft on said drive shaft, a motor, power transmitting devices interposed between said motor and said casing adjusting shaft for actuating it, and a brake for stopping the rotation of said casing actuating shaft.

11. In a loader or distributer, the combination of a rotatable material-receiving casing, a rotatable material-distributing head therein, a drive shaft for said rotary head, a hollow casing-adjusting shaft on said drive shaft, means for rotating said drive shaft, and power transmitting devices interposed between said casing adjusting shaft and said drive shaft.

12. In a loader or distributer, the combination of a carriage adapted to move forward or back, a motor mounted thereon, a material-receiving casing, a rotary material-distributing head mounted in the casing and driven by the motor, power transmitting devices interposed between the motor and the carriage running gear for effecting the travel of the carriage, comprising a pair of bevel gears connected respectively with the motor and the carriage running gear, the latter being mounted on a vertical shaft along which it is movable, and means for sliding the said bevel gear upon its shaft to move it into or out of engagement with the other bevel gear, substantially as set forth.

13. In a loader or distributer, the combination of a carriage adapted to travel forward or back, a motor mounted on the carriage, a material-receiving casing, a rotary material-distributing head within the casing driven by the motor, power transmitting devices interposed between the motor and the carriage running gear for effecting the travel of the carriage, such devices including friction gearing, one member of the friction gearing being movable along its shaft so as to be carried into or out of engagement with the other friction member, and means for operating the said movable friction member, substantially as set forth.

14. In a loader or distributer, the combination of a rotatable material-receiving casing, a rotatable material-distributing head therein, a drive shaft for said head, a hollow casing-adjusting shaft on said drive shaft, means for rotating said drive shaft, and power transmitting means interposed between said casing adjusting shaft and said drive shaft including a friction drive.

15. In a loader or distributer, the combination of a movable carriage, a rotatable material-receiving casing on the carriage, a rotary material-distributing head in said casing, a drive shaft connected with said head, a hollow casing-actuating shaft mounted on said drive shaft, power transmitting devices interposed between said casing-actuating shaft and said drive shaft, and means for controlling the action of said power transmitting devices operable from a point without the car when the casing is in working position within the car.

16. In a loader or distributer, the combination of a rotatable material-receiving casing, a rotatable material distributing head therein, means for rotating said distributing head, means for rotating said casing, and a brake for stopping the rotation of said casing.

17. In a loader or distributer, the combination of a rotatable material-receiving casing, a rotary material-distributing head therein, a drive shaft for said rotary head, means for connecting said casing to said drive shaft to effect the rotation of the former, and a brake for stopping the rotation of said casing.

In testimony whereof I affix my signature, in presence of two witnesses.

JOHN H. HUHN.

Witnesses:
C. L. MERRIFIELD,
C. D. FLEMING.